United States Patent
Rawat

(10) Patent No.: US 7,281,029 B2
(45) Date of Patent: *Oct. 9, 2007

(54) METHOD AND SYSTEM OF CAPTURING DATA FOR AUTOMATING INTERNET INTERACTIONS

(75) Inventor: Jai Rawat, Sunnyvale, CA (US)

(73) Assignee: AOL LLC, a Delaware limited liability company, Dulles, VA (US)

( * ) Notice: Subject to any disclaimer, the term of this patent is extended or adjusted under 35 U.S.C. 154(b) by 609 days.

This patent is subject to a terminal disclaimer.

(21) Appl. No.: 10/437,883

(22) Filed: May 13, 2003

(65) Prior Publication Data

US 2004/0230647 A1 Nov. 18, 2004

(51) Int. Cl.
*G06F 15/16* (2006.01)

(52) U.S. Cl. .................. 709/204; 715/507; 715/508

(58) Field of Classification Search .......... 709/217, 709/219, 205, 201, 203; 707/10; 715/505–508
See application file for complete search history.

(56) References Cited

U.S. PATENT DOCUMENTS

| | | | |
|---|---|---|---|
| 5,640,577 A | 6/1997 | Schawmer | 395/768 |
| 5,659,350 A | 8/1997 | Hendricks et al. | 348/6 |
| 5,794,259 A | 8/1998 | Kikinis | 707/507 |
| 5,799,115 A | 8/1998 | Asano et al. | 382/305 |
| 5,963,949 A | 10/1999 | Gupta et al. | |
| 5,974,430 A | 10/1999 | Mutschler, III et al. | 707/505 |
| 6,070,184 A | 5/2000 | Blount et al. | 709/200 |
| 6,088,700 A | 7/2000 | Larsen et al. | 707/10 |
| 6,192,380 B1* | 2/2001 | Light et al. | 715/505 |
| 6,199,079 B1* | 3/2001 | Gupta et al. | 715/507 |
| 6,247,029 B1 | 6/2001 | Kelley et al. | 707/507 |
| 6,249,779 B1 | 6/2001 | Hitt | |
| 6,421,693 B1 | 7/2002 | Nishiyama et al. | 707/507 |
| 6,496,855 B1 | 12/2002 | Hunt et al. | |
| 6,499,041 B1 | 12/2002 | Breslau et al. | |
| 6,499,042 B1 | 12/2002 | Markus | 707/507 |
| 6,589,290 B1* | 7/2003 | Maxwell et al. | 715/507 |
| 6,662,340 B2* | 12/2003 | Rawat et al. | 715/507 |
| 6,694,375 B1 | 2/2004 | Beddus et al. | |
| 6,757,674 B2* | 6/2004 | Wiens et al. | 707/3 |
| 6,802,042 B2* | 10/2004 | Rangan et al. | 715/501.1 |
| 6,845,390 B1* | 1/2005 | Jorgenson et al. | 709/205 |
| 6,854,085 B1* | 2/2005 | Morse | 715/507 |
| 6,859,878 B1* | 2/2005 | Kerr et al. | 713/183 |
| 6,862,612 B1* | 3/2005 | Horn et al. | 709/219 |

(Continued)

FOREIGN PATENT DOCUMENTS

EP  918 424  5/1999

(Continued)

*Primary Examiner*—Abdullahi Salad
(74) *Attorney, Agent, or Firm*—Michael A. Glenn; Glenn Patent Group

(57) ABSTRACT

A method and system for capturing data for automating interactions occurring across the Internet includes storing data at a central Web server adapted for maintaining a database. Responsive to a program script requesting data, computer program code at the central Web server selectively extracts stored data from the database, manipulates the data in accordance with the request, and supplies the manipulated data in a desired format. The program script is also able to capture manually entered data to the database when new request data is entered manually after the normal form submission.

33 Claims, 9 Drawing Sheets

U.S. PATENT DOCUMENTS

| | | | |
|---|---|---|---|
| 6,871,220 B1 * | 3/2005 | Rajan et al. | 709/218 |
| 6,879,691 B1 * | 4/2005 | Koretz | 380/255 |
| 6,944,677 B1 * | 9/2005 | Zhao | 709/244 |
| 6,950,980 B1 * | 9/2005 | Malcolm | 715/505 |
| 6,950,983 B1 * | 9/2005 | Snavely | 715/513 |
| 6,981,028 B1 * | 12/2005 | Rawat et al. | 709/217 |
| 2002/0034285 A1 * | 3/2002 | Jarvi et al. | 379/114.01 |
| 2004/0123144 A1 * | 6/2004 | Chan et al. | 713/201 |

FOREIGN PATENT DOCUMENTS

WO     WO99/46701     9/1999

\* cited by examiner

METHOD AND SYSTEM OF CAPTURING DATA FOR AUTOMATING INTERNET INTERACTIONS

This application is related to an application, U.S. Ser. No. 09/516,048, filed on Mar. 1, 2000, entitled "AN INTERNET INTERFACE SYSTEM" now U.S. Pat. No. 6,496,855. The application is also related to a copending application, U.S. Ser. No. 09/561,449, filed on Apr. 28, 2000, entitled "METHOD AND SYSTEM OF IMPLEMENTING RECORDED DATA FOR AUTOMATING INTERNET INTERACTIONS" now U.S. Pat. No. 6,981,028. The application is related to another copending application, U.S. Ser. No. 09/687,991, filed on Oct. 13, 2000, entitled "METHOD AND SYSTEM OF AUTOMATING INTERNET INTERACTIONS".

BACKGROUND OF THE INVENTION

1. Technical Field

This invention relates generally to data transmission occurring in Internet browsing. More particularly, the invention relates to a method and system of capturing data for automating interactions and transactions occurring on the Internet.

2. Description of the Prior Art

Presently, many computer users primarily employ Internet browser and mail editor applications for accessing the World Wide Web (WWW, or the Web) and for corresponding via electronic mail (e-mail). A typical browser serves as a means whereby a user is enabled to navigate from site to site on the Web, and further serves as an interface through which the user is enabled to interact with those sites by accessing the information content and various services provided. A typical mail editor enables the user to engage in digital correspondence, i.e. sending and receiving e-mail.

The capabilities of the browser and mail editor applications vary greatly depending upon the type of terminal and the operating system used. For example, while versions of these types of applications installed at home computers or office workstations, which typically employ graphical user interfaces (GUIs) and large display monitors, may be capable of exploiting rich text formats and high resolution graphics, the versions of the same applications which are typically installed on portable wireless devices may be much more restricted in terms of graphic resolution and display area.

When a user is employing a device having a small keypad and utilizing a browser of limited capabilities, navigation and data input can be tedious. In the case where the user is connected to the Internet or other network through an Internet-capable wireless telephone or Personal Digital Assistant (PDA), for example, entering a long Uniform Resource Locator (URL) for a desired Web site, typing a case-dependent e-mail address, or providing any other detailed information in alpha-numerical characters with a limited keypad is often difficult.

During any given session of Internet exploration, sometimes known as Web surfing, a user may encounter one or more sites which require data input, in the form of registration and login data, before the full capabilities of the site can be accessed. In fact, sites requiring registration and login are becoming more prevalent on a daily basis. Web sites engaged in electronic commerce (e-commerce), for example, typically require registration before purchases can be made or items can be placed up for auction by a particular user. As another example, Web sites which host e-mail services necessarily require registration and login to deliver incoming correspondence to the correct recipient.

The registration process may vary in complexity from the very simple matter of entering data into one or two fields, to the very complicated matter of providing a social security number, credit card expiration dates, and the like. In any event, a user must navigate to a site's registration page and complete a form by providing information required for registration.

As a practical matter, irrespective of the relative complexity of the registration procedure, the user is burdened with the task of recording or remembering the information provided. At a minimum, registration at any given Web site involves providing the site with a user name, or "login" name, and a password. This data is subsequently used by the site to identify the user each time the user logs in; conversely, access to a particular account will be denied or restricted if the proper account information is not entered at login.

In addition, the user must also keep a record of the sites with which the registration process has been completed or run the risk of having multiple accounts open at the same site inadvertently, which can lead to confusion. In the case where a user intends or prefers to have multiple accounts open at the same site simultaneously, it is still incumbent upon that user to maintain accurate records of user names and passwords to access the various accounts.

Even in the case where a user maintains meticulous records of all the requisite information, the correct user name and password information must be provided each time the site is accessed. Typically, a registered user of a particular Web site must navigate to that site's "login page" and complete a form by providing the necessary data in order to access the site's full functionality. In this regard, even accurate records are not useful if they are not accessible; when a user stores registration information conveniently near a home computer, for example, those records are not of value when that user is attempting to access an account from a mobile or wireless apparatus or from a computer at another location, such as an office, a library, or a Web cafe. Presently, because even portable and wireless devices are Internet-capable, a user may access the Web or e-mail accounts from virtually any building having telephone service or from any location where cellular or satellite communications are possible. Unless such a user commits numerous user names and passwords to memory, or endeavors always to keep written notes within reach, careful record-keeping practices can ultimately prove of limited utility.

Further, many Web sites request users to supply data through the process of filling out forms independently of any registration or login processes. A browsing user is often required to submit information such as mailing address, billing address, credit card information, or e-mail address. With Internet activity increasing and e-commerce growing at a fantastic rate, there is a continuing and escalating need for a convenient and efficient system for organizing a user's personal account information and, more importantly, implementing that information during Web browsing.

Such a system should take into account the fact that many users are presently accessing the Internet from multiple locations and multiple computer terminals or workstations, some of which may have small or limited-function keypads and lack sophisticated input devices and displays. Moreover, to provide maximum convenience and utility, a system organizing and implementing a user's account information should provide an easy, convenient way to capture user's new login information or registration information, and apply captured data to automate much of the interaction which is currently completed manually. The capture of user's new login information or registration information should not interrupt the normal form submission flow and only capture data when a successful response is recognized.

SUMMARY OF THE INVENTION

The invention addresses the foregoing and other shortcomings of conventional Internet communications and data transmission interactions by providing a system for automating many of the tedious interactions which are required of a user during a typical Internet browsing session.

In one embodiment, the system of the invention includes storing a registered user's personal account information in a secure, encrypted central database which is accessible from any Internet-capable device with a single user name and password. For example, a user name and password may be stored in association with an account at a particular Web site, along with the Uniform Resource Locator, or URL, of that site's login page. For a second account at a second Web site, the user may have selected a different user name and a different password; this information, likewise, is stored in the central database, along with the URL for the login page of the second Web site. Upon login to the system of the invention, the registered user has access to the full functional capabilities of the unique interface provided by the system, as well as any and all account information related to that user's various Web site specific accounts. Ideally, this system requires memorization of only a single user name and a single password, regardless of the number of specific accounts which are maintained at any of a plurality of different Web sites at any given time.

Specifically, the invention is related to a system providing an interface between the foregoing central database and the various Web sites visited by the user during the course of browsing the Internet. In one embodiment, a utility window or navigation bar may be appended to the user's standard browser navigation window, and may be used to interface with the system and to access its capabilities. In another embodiment, standard elements of a browser may enable a user to access the functional capabilities of the system directly; this embodiment may be particularly desirable for use in conjunction with text-based browsers, such as are employed by Personal Digital Assistants (PDAs) or Internet-enabled wireless telephones, for example. The programming scripts employed by the system, and invoked through the browser, automate many of the tasks ordinarily completed manually by the user.

According to one embodiment of the invention, for example, a user's personal information stored in the central database is accessed by the system such that registration forms associated with opening an account may be completed automatically. As an example, the system may be adapted separately to maintain a vast database of common Web sites, including the URLs of their respective registration pages as well as the nature and format of their respective registration forms. Convenient hyperlinks may be offered to a user through the browser, for instance, upon login to the system such that if the user desires to register with a mapped Web site, the program code embodied in the system communicates with the proper site and completes the appropriate sections of the registration form without intervention on the part of the user. In addition, if a user desires to register with a Web site and independently navigates to the page containing the form, the system may be adapted to recognize that the user is attempting to create a registered account which has not previously been recorded, and may prompt the user to record the registration information if desired.

Further, the form filling feature of the invention is not limited to registration forms. Many other types of forms exist in the Internet universe, and the invention is adapted to access recorded user data and to implement the same in filling virtually any type of form a user is likely to encounter. In particular, a common type of form which is filled on a regular basis is a login form; the system of the invention provides an automatic login procedure through which a user may be automatically logged in to a pre-existing registered account.

In accordance with this aspect of the invention, a user may login to a Web site or mail server quickly and easily without having to re-enter a user name and password at each subsequent visit. As noted above, the central database may store a specific user name and password associated with each and every account maintained by the user; when the user wishes to access a particular account at a specific Web site or mail server, the invention allows the user to invoke program scripts at the central server which automate the login procedure. The central server navigates to the proper page or site, identifies the login form, accesses the appropriate user name and password information from the database, completes the form with the proper user data extracted from the database, and submits the form on behalf of the user automatically, thus logging the user into the account at the site. As noted above, such automation may be particularly desirable in the case where a user is operating a terminal having a limited-function keypad or cumbersome navigation tools.

Additionally, the system may be adapted to recognize when a user is attempting to login manually to an account which has not already been recorded in the central database, and may prompt the user to store the account information only after a successful login response if detected. The user may thereby be relieved of the obligation to remember which password is associated with which account at a given Web site.

As indicated above, an important aspect of the invention is that its operation is not limited with respect to location or to a particular computer terminal or workstation. Upon registering with the system for the first time, the user is subsequently enabled to access its functionality from virtually any Internet-capable computer terminal or device.

DETAILED DESCRIPTION OF THE INVENTION

Figure 1:
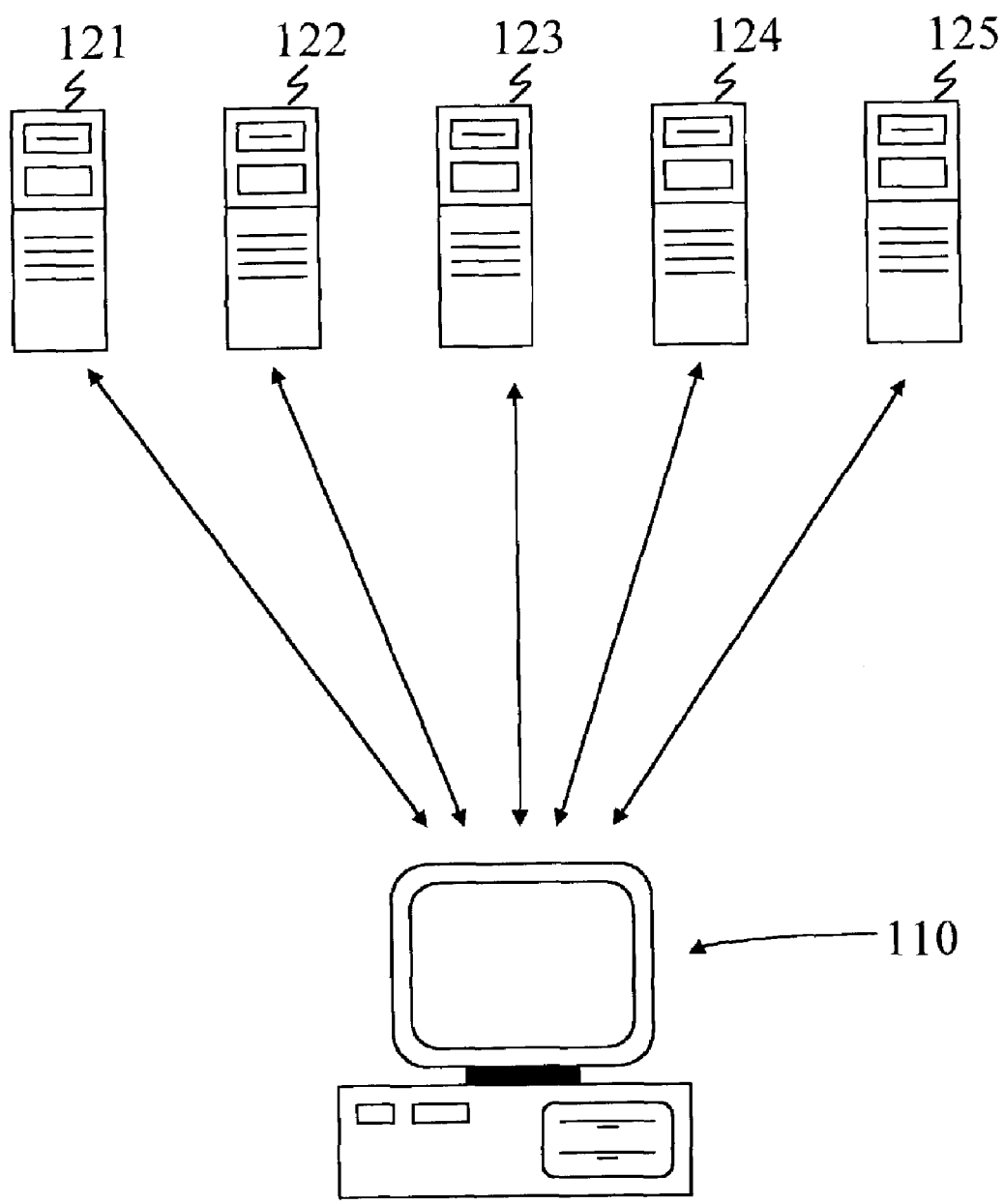
FIG. 1 is a simplified diagrammatic view of the interaction presently required between an Internet user and various sites with which the user may maintain registered accounts.

FIG. 1 illustrates a simplified diagrammatic view of the interaction presently required between a typical Internet user and several sites with which that user may maintain at least one registered account. Conventionally, a user connects to the Internet by means of a computer terminal 110 such as a desktop personal computer (PC) or workstation, a laptop, notebook, subnotebook, or portable machine such as a Personal Digital Assistant (PDA), a Personal Communications Systems (PCS), an Internet-enabled wireless telephone or other wireless hand-held device, and the like. Once connected to the Internet, the user accesses e-mail accounts and visits Web servers, or sites, such as those represented by reference numerals 121-125, through means of one or more software applications, such as a Web browser. During the course of visiting the numerous sites which form the framework of the Internet, the user is frequently prompted to register, or to open an account, with a particular site; registration serves both to enable the Web server to identify the user, as well as to simplify certain aspects of interaction with the site for the user on subsequent visits.

For example, sites which specialize in auctions, sales of goods, service oriented business transactions, and the like via the Internet (e-commerce), frequently require a user to maintain a registered account at the site before the user may be permitted to use services offered at the site. The amount and type of account information for a particular user maintained at any given site varies considerably, depending upon the nature of the business conducted; some examples of the nature of information requested from the user during registration include first and last name, date of birth, mailing address, gender, social security number, credit card numbers and expiration dates, mother's maiden name, and so forth. Billing addresses and preferred shipping addresses are common data requested by e-commerce sites specializing in the sale of goods. In theory, the sites' maintaining respective databases of such information for a registered user offers the user convenience and efficiency upon subsequent visits to the Web site.

In practice, however, registering with Web sites often places a significant burden on the user. Providing the site with required or requested information generally involves completing and submitting a form. Completing such forms is onerous, and unavoidably introduces the possibility of error, such as misspellings or transposition of numbers, with every submission. Particularly when the user is operating a PDA, an Internet-capable wireless PCS, or other hand-held device which may have limited or awkward input mechanisms, data entry can be exceptionally problematic. Additionally, once the form has been submitted and the registration process is complete, it is incumbent upon the user to remember the user name and password required to access the registered account.

Looking more closely at FIG. 1, the effect of a user's maintaining an account at a plurality of sites is apparent. At a minimum, registration with a Web site, such as sites 121-125 in FIG. 1, requires creating an account which can be accessed only by supplying the correct user name and password during login. That is, to access the full range of services provided at a particular site upon subsequent visits, a user is required to submit, through computer terminal 110, the user name and password selected originally during the registration process.

As is evident from inspection of FIG. 1, a user having a separate account at each of sites 121-125 is required to maintain accurate records of at least five separate user names and passwords. While certain of these user names and passwords may be used for more than one account, users often feel that use of a different user name and password for each account is preferable for security reasons.

During a typical Web browsing session, a user may wish to login to a registered account at a particular Web site, for example, site 121 in FIG. 1. To login to site 121, the user must first navigate to the correct login page associated with site 121. Upon arriving at the login page, the user is presented with a login form, into which the user must enter the correct user name and password in order to access the account. When the form is completed and submitted, the user is logged into the appropriate account at site 121. If the user then wishes to login to a different registered account which may be at a different Web site, such as site 122 in FIG. 1, for example, the above process must be repeated at the appropriate login page for site 122. As noted above, navigating from site to site and entering user account data on a portable or mobile device may be particularly cumbersome and awkward.

In the case where a user is not registered with a particular site, such as site 123 in FIG. 1 for example, the user may be required to register prior to making full use of the services available. To register with site 123, the user must first navigate to the correct registration page associated with site 123. Upon arriving at the registration page, the user is typically presented with a form, into which the user must enter a wide range of registration information to create an account. When the form is completed and submitted, the user may subsequently login to the newly created account, for example, in the manner described above.

In any event, account data must be transmitted between the user's computer terminal 110 and the various sites 121-125 each time the user wishes to login to a particular account; these data transmission interactions are represented by the arrows in FIG. 1. The interaction between the user and the Web site, required in the name of convenience, is ultimately tedious and necessarily subject to error. Further, as noted above, the data required during the registration and login procedures are typically unique for each account, requiring the user to remember such data or to record it in a convenient, yet secure, location.

Figure 2:
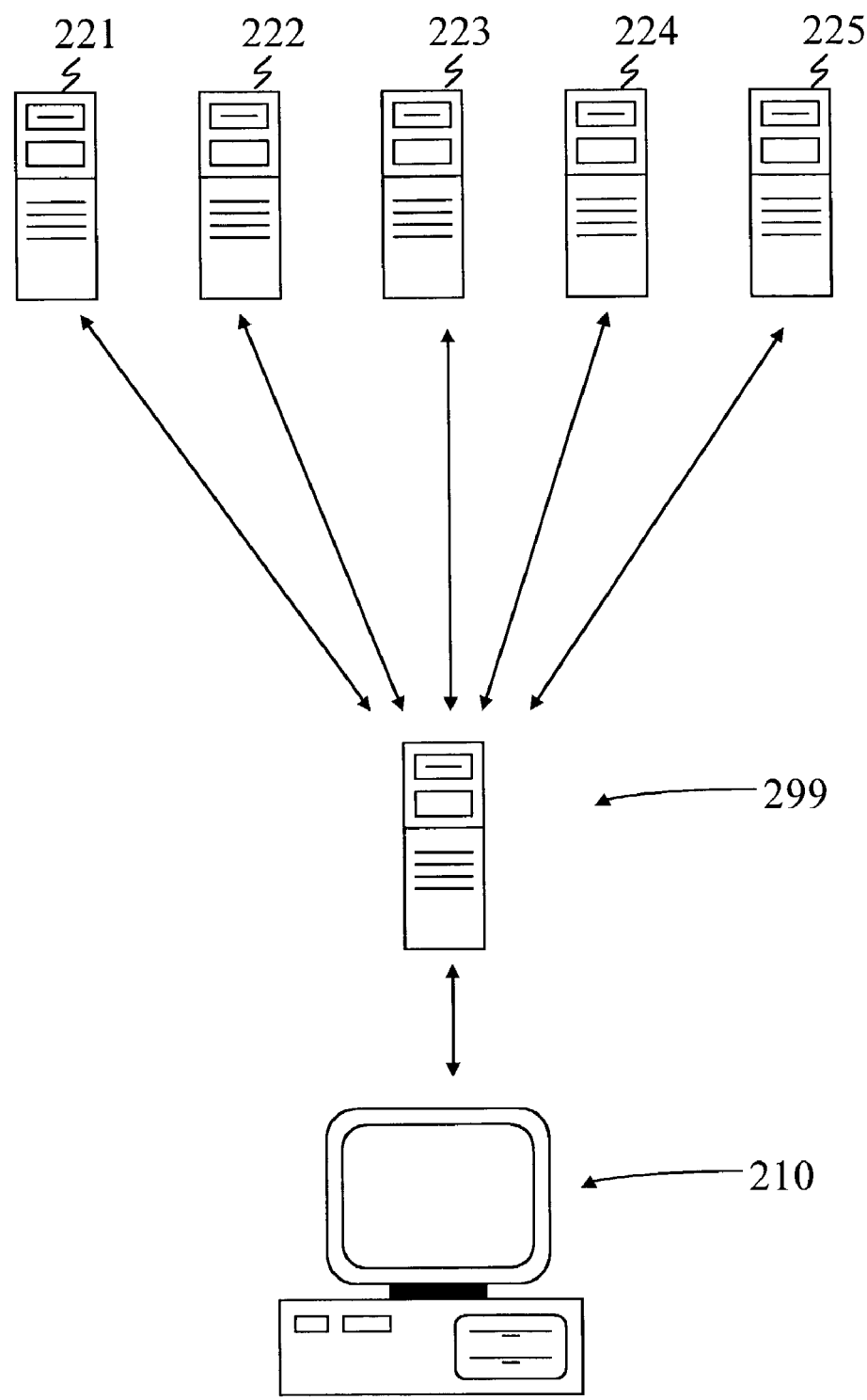
FIG. 2 is a simplified diagrammatic view of the interaction required between an Internet user and various sites with which the user may maintain registered accounts, with the system of the invention acting as an intermediary.

FIG. 2 is a simplified diagrammatic view of the interaction required between an Internet user and the system of the invention acting as an intermediary between the user and the various sites with which that user may maintain registered accounts. As illustrated in FIG. 2, the user's computer terminal 210 corresponds to computer terminal 110 illustrated in FIG. 1.

As discussed above, computer terminal 210 may be any type of Internet-capable machine, including PCs and workstations as well as a wide variety of portable devices such as PDAs, PCSs, Internet-enabled wireless telephones, other wireless hand-held devices, and so forth. Additionally, users may have access to the Internet through communication and navigation systems installed in vehicles such as automobiles or boats, for example, or through interactive, Internet-capable television systems (cable or satellite based), and the like. Those of skill in the art will appreciate that the invention is not limited by the type of device used to access the Internet; the method and system set forth herein are equally applicable to any and all Internet-enabled devices. Importantly, the method or means by which computer terminal 210 is connected to the Internet is immaterial. The connection may be through traditional land-line telephone dial-up service, Digital Subscriber Line (DSL) service, a T-1, T-3, or ISDN network, fiber-optic or cable modem connections, wireless or satellite communications, and the like.

It will be appreciated by those of skill in the art that the method of connection may affect the communication protocols employed by the network hardware as well as the file format required by the user's computer terminal 210. For example, whereas a PC or workstation equipped with a traditional Graphical User Interface (GUI) and Internet browser software may be adapted to display Web content provided in Hypertext Markup Language (HTML), various mobile or wireless devices such as PDAs, PCSs, and the like may be adapted to display different types of markup languages such as Extensible Markup Language (XML), Hand-Held Device Markup Language (HDML), Wireless Markup Language (WML), compact HTML (cHTML), extensible HTML (xHTML), Dynamic HTML (DHTML), and so forth. In general, connection with a mobile or cellular Internet Service Provider (ISP) automatically establishes the correct protocols and determines the proper file format for the specific type of network connection and computer terminal 210. The system of the invention is not limited to a specific markup language or file format.

Once the connection to the Internet is made, irrespective of the method, the user may employ a software application, such as a Web browser installed on computer terminal 210, for example, to navigate to a Web site hosting a centralized server and database, such as indicated by reference numeral 299. In the case of a PDA or other portable or wireless computer terminal 210, Internet navigation and e-mail functionality may be handled by the operating system and proprietary software which is provided by the manufacturer of the device.

In the several embodiments of the invention, the user may open a registered account at the central, Web-based server 299. This registration procedure, as with typical Web site registrations, requires the user to select a user name and password for identification and security purposes, respectively. Upon registration with central server 299, the user may login to the registered account on subsequent visits by completing and submitting the login form with the correct user name and password. The foregoing procedures are not substantially different from the typical registration and login procedures required by ordinary Web sites. The invention provides substantial benefits in terms of convenience and utility, however, after the user is logged in to the registered account at central server 299.

For example, as is illustrated in FIG. 2, the user need only login once, to central server 299, during a particular Web browsing session; subsequent form filling and login procedures at various other sites, such as sites 221-225, for instance, require little or no interaction on the part of the user. Data transmission interactions are represented by the arrows in FIG. 2. With respect to form filling or registration procedures, for example, central server 299 may handle all data entry, completing forms automatically; the user need only review the information for accuracy and submit the completed form. It may be desirable in certain circumstances to submit the completed form on behalf of the user directly from central server 299; this submission must be made through the user's computer terminal 210, but may be accomplished without requiring any action by the user. With respect to subsequent login procedures for registered accounts at other Web servers such as 221-225, central server 299 may handle the navigation, data entry, and login form submission tasks automatically, logging the user in to a desired account at a particular Web site with virtually no action required by the user.

Advantageously, central server 299 is adapted to maintain a detailed database for the user, including a vast array of personal information supplied by the user. The data recorded may be both general as well as account-specific. For example, general, or global, information may include first and last name, primary billing address, and social security number, and the like; this information is typically constant, irrespective of the Web site with which an account may be maintained. Examples of account-specific information may include user name and password, URL of the login page for the account, favorite genre of literature, and the like; this information may vary according to the information most relevant to the particular site with which the account is maintained.

Importantly, the foregoing general and account-specific information recorded in the database is easily accessible to the user, through login with central server 299, and may be transmitted at appropriate times automatically through the functionality of the system as set forth in detail below. In this regard, the user name and password associated with the user's registered account with central server 299 become global; the user need only remember these two items of information to allow the system of the invention, through central server 299, to serve as an interface with the rest of the Internet universe. The user is thus relieved of the burden of remembering, for example, the URL of a site's login page along with the user name and password selected for a particular account at that site.

Figure 3:
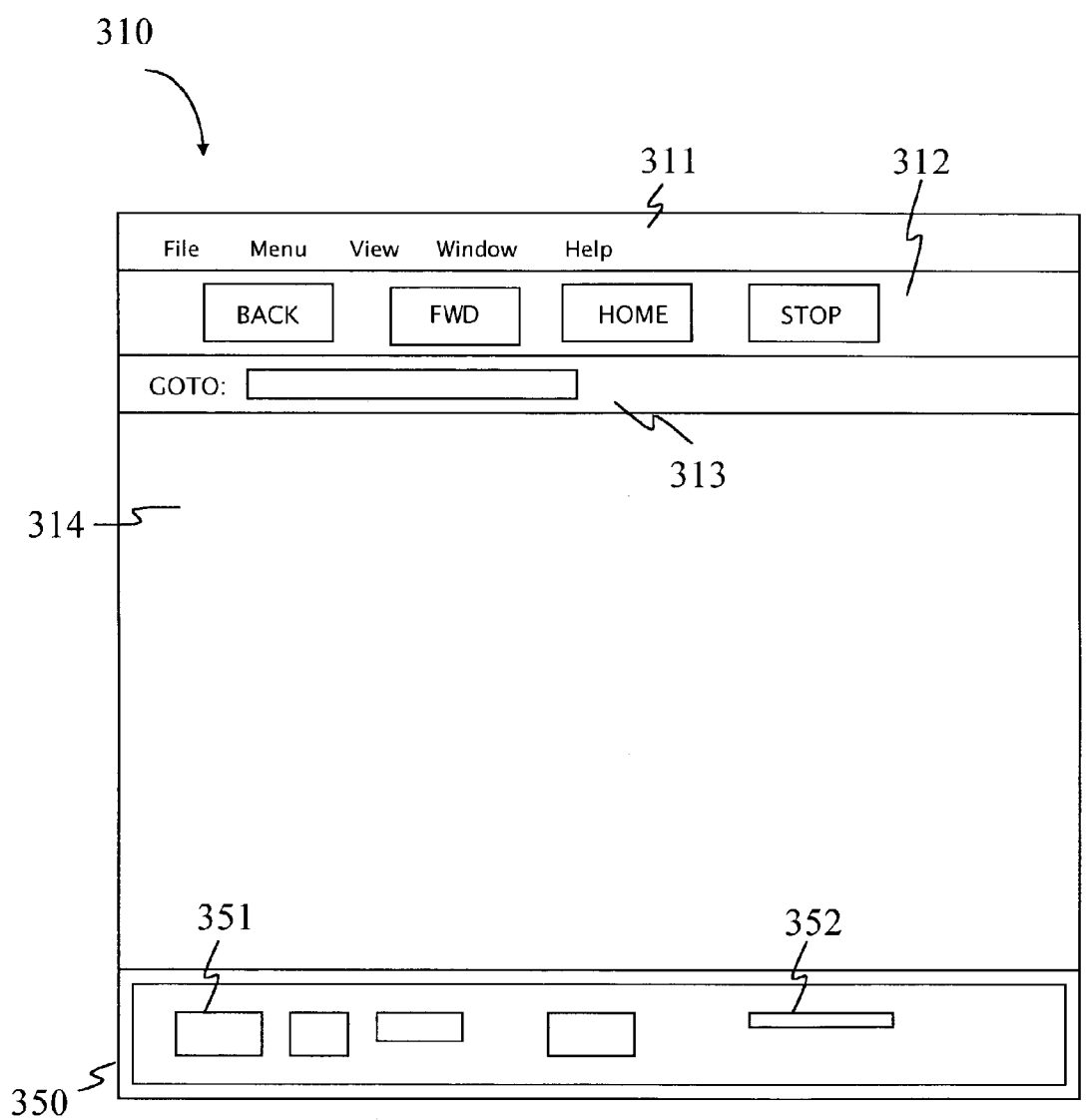
FIG. 3 is a simplified view of the Graphical User Interface presented by an ordinary Web browser application modified to include one embodiment of the interface according to the invention.

In one embodiment of the invention, a unique interface is provided for accessing the functionality of the system. FIG. 3 is a simplified view of the GUI presented by an ordinary Web browser application modified to include the expanded interface of the invention. A conventional Web browser application provides the user with a GUI 310 through which interaction with the Internet is enabled. In a standard configuration, GUI 310 may include a menu bar 311 for interacting with the browser software, a control bar 312 for navigation, data management, and other purposes, and a text box 313 for entering text, such as the URL of a desired Web site, for example. These elements are common in the art. The primary element of the browser GUI 310 is the navigation window 314, in which the contents of the various Web sites and pages are displayed; Web site content includes, for example, text, video, hyperlinks to other Web sites, and interactive forms which must be completed and submitted.

As can be seen at the bottom of FIG. 3, the Web browser GUI 310 modified in accordance with this embodiment of the invention includes a utility window 350 appended to navigation window 314. In this embodiment, utility window 350 serves as an interface for accessing the various capabilities of the system; the requisite code for expanding the capabilities of the browser to include utility window 350 may be downloaded and installed into the user's computer terminal 210 automatically upon registration with the central server 299 in FIG. 2, for example. As an alternative, the browser software may be modified independently of the registration process, such as, for example, after the user already has a registered account and wishes to access that account from a computer which does not already have the software for utility window 350 installed.

A more detailed description of FIG. 3 related to the installation and operation of utility window 350, as well as the interaction between browser software, utility window 350, and the functionality of the system software is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

Figure 4:
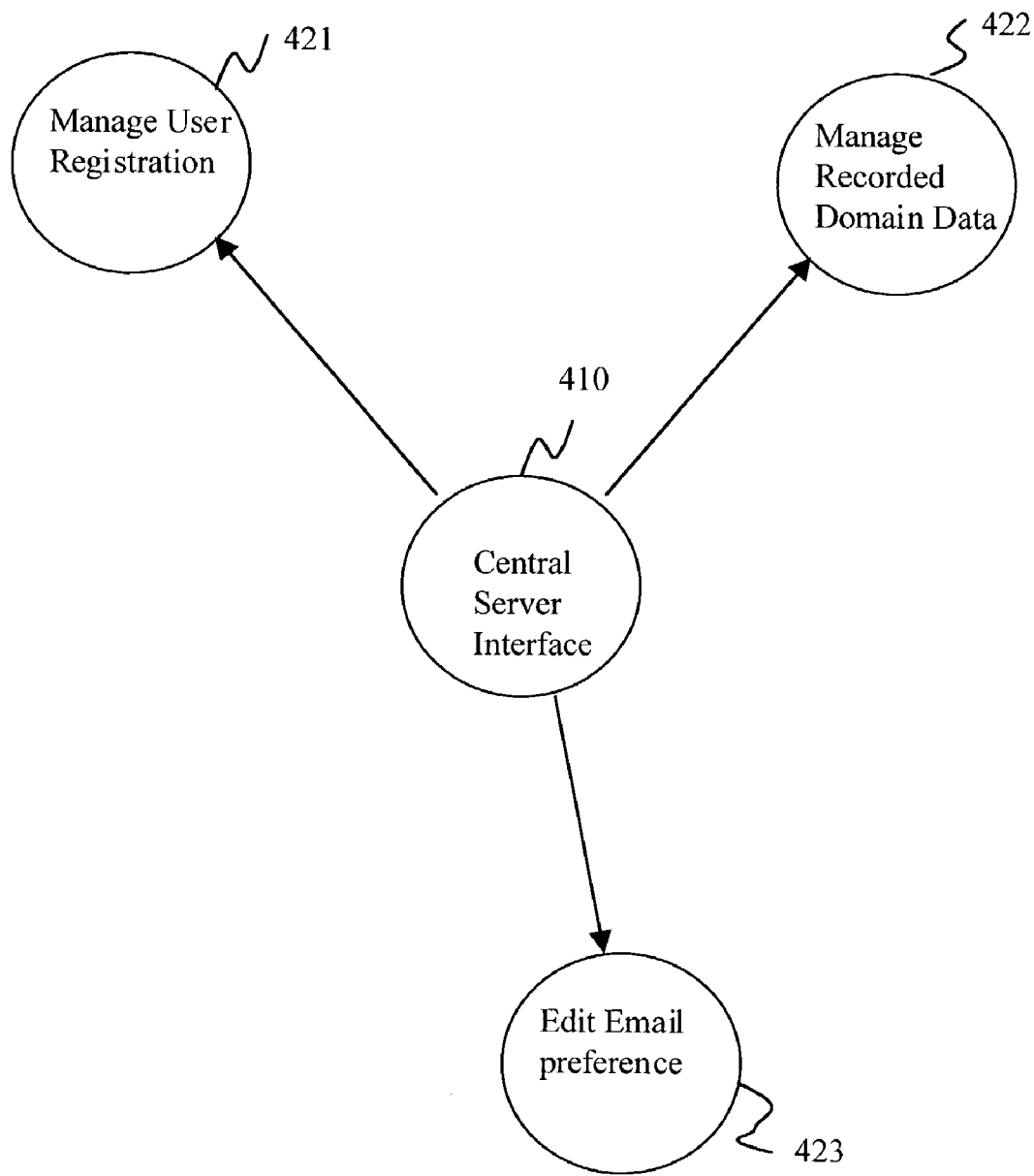
FIG. 4 is a simplified view of the main functions of user interface such as the utility window according to the invention.

FIG. 4 is a simplified view of the main functions of user interface 410 to central server of the invention. The user interface may be represent by the utility window 350 in FIG. 3, or any other means by which the user can interact with. These functions include managing user registration 421, managing user record data 422 and modifying user's email preference.

The management of user registration 421 provides means to change any registration data of the user, especially the user's password.

The management of user recorded domain data 422 provides means to allow user's to record data specific to a new domain manually, such as login information associated with servers 221-225, change recorded data of the domain, or delete recorded data for the domain.

The editing of user's email preference 423 provides means to change the configuration of user's email forwarding and filtering options.

As noted above, browser software, or perhaps a mobile operating system itself, at the user's computer terminal 210 generally serves as a front-end interface between the user and the system; the system, in turn, provides an interface between the central server 299 of FIG. 2 and the various sites 221-225 visited by the user, automating certain tedious tasks commonly encountered during Web browsing. In particular, the functionality provided by the system is substantially as follows: effective universal Internet identity and e-mail filtering and forwarding; automatic form filling for virtually any form encountered during Web browsing; and automatic login to sites where a registered account is maintained. These functional aspects of the system are addressed in detail below.

As described above with reference to FIG. 2, upon registration with central server 299, the user has an effective universal user name and password. Once logged into the registered account with central server 299, the user need not remember any additional passwords or other information which may have been disseminated to the various Web sites 221-225 for the purpose of registering or maintaining an account therewith. The requisite information is stored in one or more database records at central server 299 and is readily accessible by the user once logged in to the system. In addition to being relieved of the burden of remembering and organizing an overwhelming amount of information, another benefit to the user of the system of the invention is that the universal user name and password facilitate e-mail filtering and forwarding.

Figure 5:
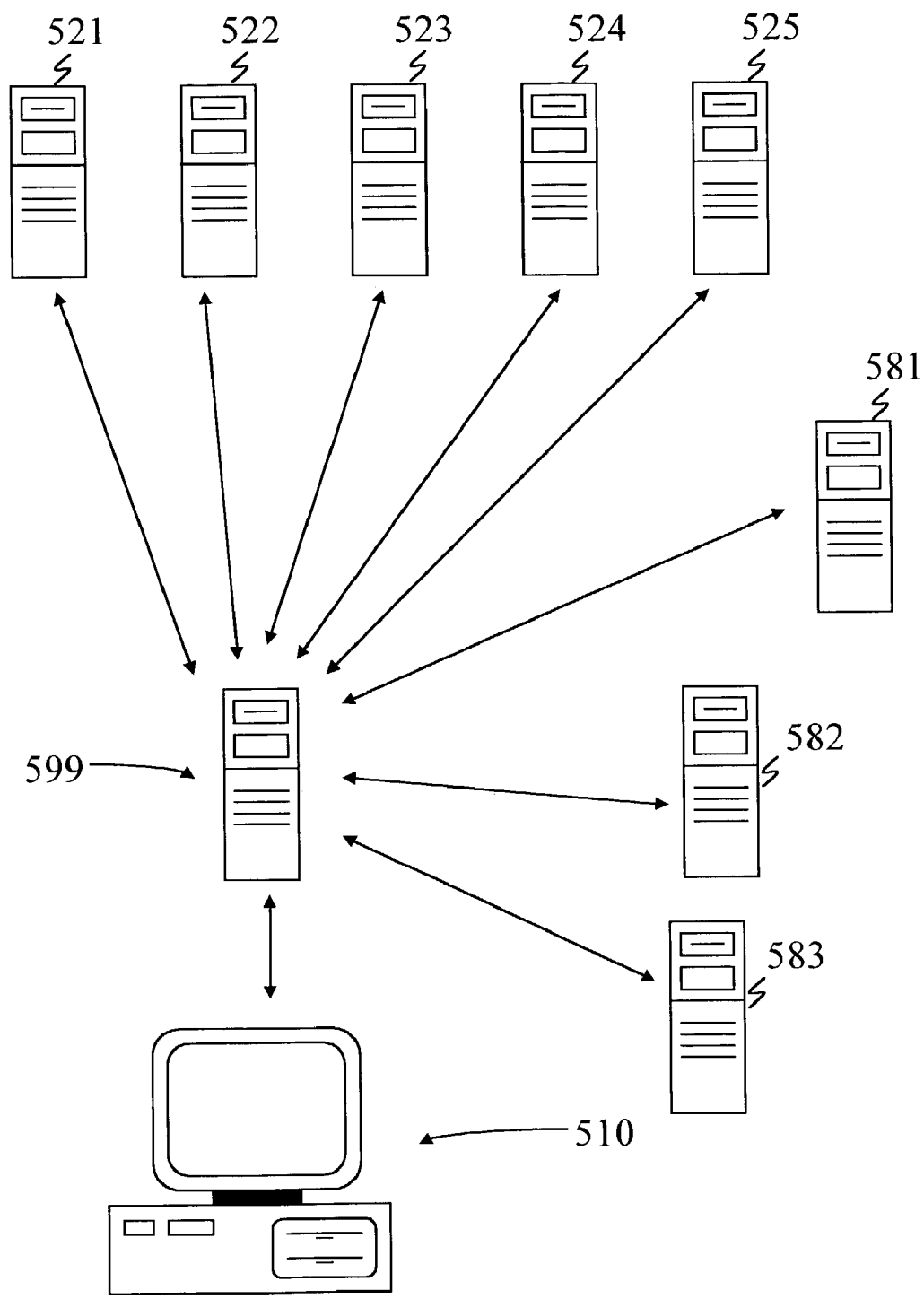
FIG. 5 is a simplified diagrammatic view of the interaction between the central server and several servers with which a user maintains registered accounts according to the invention.

FIG. 5 is a simplified diagrammatic view of the interaction between the central server 599 of the invention and several servers 581-583 with which a user maintains registered accounts. In FIG. 5, central server 599 corresponds to that represented by reference numeral 299 in FIG. 2, and the user's computer terminal 510 corresponds to computer terminal 210. Various Web sites 521-525 are shown in FIG. 5 along with a plurality of servers, denoted as servers 581-583, at which a user may maintain one or more registered e-mail accounts. The servers 581-583 may, for example, correspond to a user's home e-mail account, school e-mail account, and work e-mail account, respectively. It will be appreciated that a user may maintain more or fewer than three e-mail accounts, and furthermore that more than one e-mail account may be maintained at a single server; accordingly, the arrangement of FIG. 5 is illustrated by way of example only.

According to one embodiment of the invention, a user may be provided with a universal virtual e-mail address upon registration with central server 599. This universal e-mail address may be characterized as virtual because the system may not actually maintain a full service e-mail account for the user at central server 599, but rather only function to forward incoming mail to one or more of a plurality of registered e-mail accounts at one or more of a plurality of servers designated by the user. For example, e-mail delivered to the user's universal virtual e-mail address at central server 599 may be selectively forwarded to a single account at server 581 exclusively, or it may be selectively forwarded to one or more registered accounts at all of the servers 581-583. In any event, the user's friends, relatives, business contacts, and others representing the entire Internet universe all send electronic correspondence to a single address at central server 599, where it may be directed according to the user's preference.

A more detailed description of the universal virtual e-mail functionality of the invention is set forth with reference to FIG. 5 in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

Web sites often request that a browsing user supply information, and many of the most popular Web sites, particularly those engaged in e-commerce, actually require as much. As a consequence, a user is often faced with the onerous task of filling out forms during a given Web browsing session.

As described above, the system of the invention maintains detailed records of information provided by a user both during the registration process and subsequent to registration, at the user's discretion. That is, when a user creates a registered account at the central server, the server creates a database record for that particular user; various user data may be retained. The server may request information from the user in as granular a format as possible; that is, telephone numbers, for example, may be segmented into at least four fields corresponding to country code, area code, full telephone number, and extension. As another example, names may be stored at the server in first name, middle name, last name format rather than as a single field. In this manner, the system of the invention may be adapted to provide data to various forms requiring data in any one of numerous formats.

By way of background, typical forms encountered during Web exploration may be encoded in the HTML documents, or pages, visited by the user during browsing. In the case of wireless PDAs and Internet-capable telephones, the documents may be in another format, such as HDML, WML, cHTML, xHTML, DHTML, and the like, as noted above. It will be appreciated by those of skill in the art that the invention is not limited to any specific document format or communication protocol; the following discussion refers to these file formats using the generic term: markup language (ML).

Any given ML page may include one or more forms, distinguished in the underlying ML code. The system of the invention utilizes program code at the central server to parse the ML pages when the user invokes the form filling function. The program code is adapted to identify text strings in the ML code which represent forms embedded therein; each form contains one or more "meta types" recognizable by the system. Each meta type represents a logical data block comprising one or more information fields which are logically related in a meaningful way. Each information field, in turn, has a particular format associated therewith. The foregoing hierarchy of form components assists the system in assigning the granular user data to the correct location in the form during the form fill process.

In this regard, it will be appreciated that classifying different types of data according to meta type enables the system to approach the task of completing forms in an efficient manner which minimizes system overhead and user inconvenience. Either before or during the form fill process, for example, each meta type in its entirety, along with the specific data used for filling its fields, may be selected independently; that is, the user may employ drop-down menus or other GUI mechanisms provided in the utility window to select from a plurality of previously stored data within a given meta type. The interface in the utility window may be adapted to accommodate such selection through inclusion of a drop-down menu for each meta type, for example. In the case of user interfaces limited to text-only displays, a separate text-based menu may be provided for user selection of meta types; as noted above, such an option may be made accessible through the utility window in FIG. 5, for example.

A more detailed description of meta types and the form filling functionality of the invention is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

In accordance with one embodiment of the invention, the user data stored at the central server is extracted from the database and manipulated so as to conform with the formatting requirements of the form by the program software at the server. The properly formatted user data may be used to fill a desired form such that the user need not enter the information manually; subsequently, the filled form may be transmitted to the user's computer terminal or portable device for verification or alteration. In an alternative embodiment, it may be desirable to use program code at the server to submit the filled form automatically, without any interaction from the user. While the number, type, and format of forms a user may encounter on the Internet are as varied as the number of Web sites requesting their completion, the system of the invention recognizes any given form as falling into one of two broad categories: those forms which have been mapped into the system's database; and those forms which have not been mapped.

In addition to maintaining a database of user information at a central Web-based server, the system of the invention is adapted to maintain a database of form data related to the numerous forms which may be encountered most often by users browsing the Web; these forms, required or requested by the most popular or most frequently visited Web sites, for example, may be mapped. Mapped forms have been parsed, for example, by a software script adapted to read the underlying ML code of the Web page containing the form.

The mapping process enables the system to recognize a previously mapped form upon subsequent encounters therewith; recognition of a particular form's fields and structure, in turn, enables the program code at the server to input the correct user data into each field, in the proper format, efficiently and systematically. Accordingly, mapping a form may involve all of the following: examining the underlying ML code for the purpose of analyzing the form's structure and arrangement; identifying the required fields, the optional fields, and the requested format of each; matching the form fields with the user data fields in the database to which they correspond; and recording all of the foregoing information under a unique identifier string through which the system may prospectively identify that particular form.

A more detailed description of the ML parsing process, the mapping procedures used by the system of the invention, and the granularity of database records is set forth in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

Figure 6:
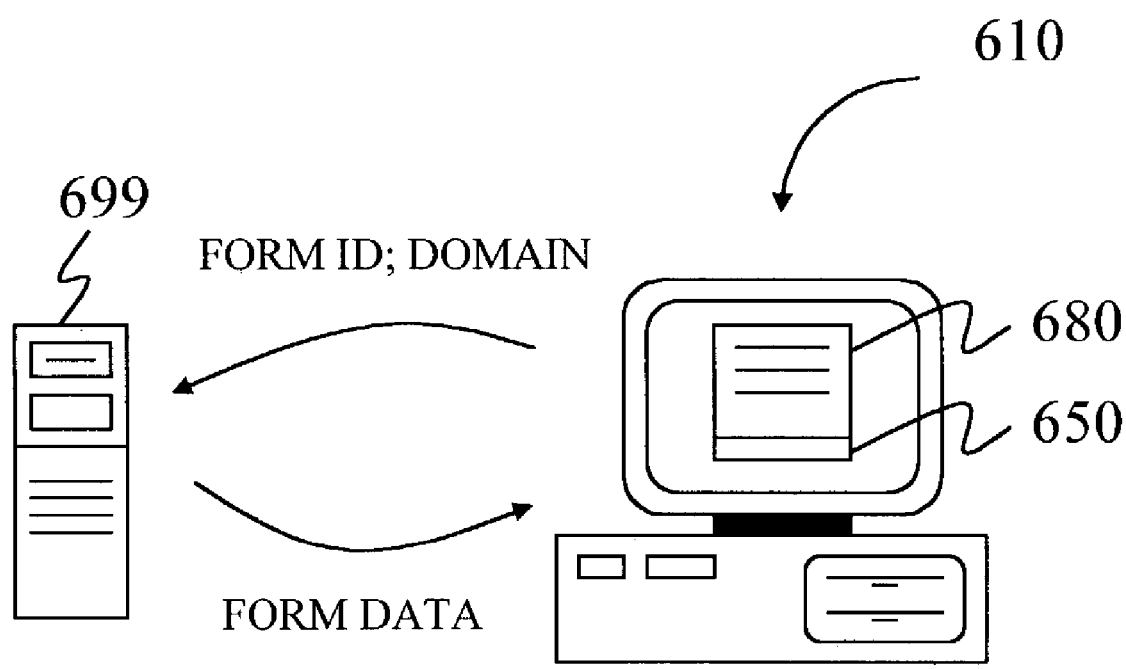
FIG. 6 is a simplified diagrammatic view of one embodiment of the interaction between the central server and a form page of a typical Web site according to the invention.

In one embodiment, the form filling feature of the invention may employ both the program code at the central server as well as the code underlying the enhanced interface, such as described above with reference to FIG. 3, provided at the user's computer terminal. FIG. 6 is a simplified diagrammatic view of the interaction between the central server 699 of the invention and a form page of a typical Web site visited by a user at a computer terminal 610. In FIG. 6, the form 680 may correspond to form 480 discussed above with reference to FIG. 4. The standard Internet browser's capabilities have been expanded to include the utility window 650 which may correspond to utility window 350 described above. As discussed previously, upon login with central server 699, certain of the system utilities may be imported into utility window 650 by means of program code which may affect the appearance and operation of utility window 650.

In this particular embodiment of the invention, user interface with the form filling function is enabled, and may be presented to the user in the form of an operative button, such as illustrated in FIG. 3 as button 351, or as an operative option in a menu, for example. A more detailed description of the interaction between central server 699 and the user's computer terminal 610 with respect to the form filling functionality of the invention is set forth with reference to FIG. 7 in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

In one embodiment, for example, the programming code at central server 699 may simply extract the appropriate user data from the database records and return that data to the user's computer terminal 610 for filling form 680; the filled or partially filled form 680 may then be displayed to the user, who may alter, delete, or add information selectively. This embodiment provides two advantages: the user has an opportunity to delete or to modify optional information which the user does not wish to supply as specifically recorded in the database; and previously unmapped forms may be mapped according to the information provided by the user. As noted briefly above, the system may alternatively be adapted to submit the form automatically. In such a case, the user may be prompted selectively to supply any optional data at the user's discretion.

It will be appreciated from the foregoing that, once the user has logged in to the registered account at central server, the form filling feature provides a significant convenience. Simply by selecting the form fill option, for example through a utility window or through standard browser interface mechanisms, the user can complete an entire form or portions of a form automatically with little or no manual input. In addition, the system may recognize input from the user when a particular page is unloaded indicating that a form, which has been filled manually by the user, is being submitted independent of the form filling feature. In this manner, the system can learn from the user's experiences, mapping forms for future form fill operations invoked by other users.

In another embodiment of the invention, the user is allowed to specify whether additional authentication is needed for certain recorded data or for certain domain. If additional authentication has been specified for a domain the user is requesting to send data to, or additional authentication has been specified for the recorded data that is to be submitted to a domain, then the user is required to enter his registration password again. Note that this is the registration password for "system" as opposed to the site. Also, an alternative implementation is to allow users to create a second password over and above the registration password and ask for the second password for protected data/site. The request only proceeds if the registration password is correct. This flexibility enables the user to protected sensitive data or domain sites by requesting additional authentication, while maintain the automatically login feature for other recorded data or domain sites which are less sensitive.

The system of the invention also offers appreciable convenience when a user desires to login to a particular registered account at an e-mail server or an e-commerce Web site, for example. A typical Web browser application offers a list, which may be edited, of the Web sites most frequently visited by the user. As commonly implemented, a "bookmarks" or "favorites" list merely enables the user to navigate to a particular site without having to enter the site's URL string; that is, the typical bookmark is only a navigational tool which is capable of no more than directing the browser to a specified address in cyber-space.

The invention, on the other hand, combines the navigational utility of the typical bookmark with a customized form filling operation which substantially simplifies login procedures by eliminating the need for data input. The net result of this combination is a smart bookmark, which not only navigates a user to the login page of a specified account, but also completes and submits the login form, thereby logging the user in to a registered account without further intervention by the user.

The interface for this login feature may be installed into the utility window upon login with the central server as described above with reference to FIG. 3; in this particular instance, the interface may comprise a drop-down menu, for example, which may include an operative option for setting up an account to be displayed as an independent selection in the menu. As an alternative which may be particularly advantageous in the context of mobile or wireless computer devices, the ordinary browser interface is used to invoke the automatic login feature. In either case, requests for login may be directed through the central server of the system.

By way of background, the types of registered accounts to which a user may be entitled access vary considerably. In the same manner in which a user may maintain multiple e-mail accounts at a single e-mail server, a user may also maintain more than one registered account at other types of servers, such as e-commerce Web sites, for example. The system of the invention accommodates recordation of necessary data concerning multiple accounts in the same domain, corresponding to a home account and a work account, for example, at the same server.

Conversely, an account at one site may entitle a registered user to login at a different Web site in an entirely different domain, perhaps operated by the same entity or a co-brand partner; that is, creating an account at one Web site may potentially entitle the registered user to access that Web site's partner sites in different locations using the same user name and password recognized by the site with which the user is registered. The system of the invention is able to recognize these types of partnership accounts, at least with respect to mapped sites; this recognition is not limited to the mapped sites.

Because a plurality of accounts may be accessed through the central server, for example, each account for which the login feature may be invoked may be given a unique identifier, or nickname, for identifying the account. The nickname of each account may be displayed to the user, for example, in menu or list form. In the case where a user is attempting to submit data concerning a second or subsequent account in the same domain, the program code at the central server may inform the user that an account already exists at the selected site, and prompt the user to confirm a new user name and password along with a different nickname for the new account.

As noted above, during a particular Web browsing session, a user need only select an account from the menu or list, in order to invoke the program scripts at the central server which logs the user in to the selected registered account. Initially, however, the accounts for which the login feature is activated must be input so as to be recognized by the system. An account data interface is typically presented to the user when the account data is not previously entered. For example, when a user navigates to a web domain which has a login form which is sent to the central server to be parsed and mapped. If the account data is not previously entered, a new window is presented and records the user's the login name and password associated with the domain. A more detailed description of the manner in which account data may be recorded is provided in copending application, U.S. Ser. No. 09/561,449, filed Apr. 28, 2000, entitled "METHOD AND SYSTEM OF IMPLEMENTING RECORDED DATA FOR AUTOMATING INTERNET INTERACTIONS".

The way of recording account data has several disadvantages. First it seems to interrupts the user's normal login flow which may be not acceptable by all users. Further, because these data are directed to the central server and are not authenticated by the current web domain, the user may input account data which may be invalid the current web domain either because of inaccuracy of user's memory or even just a typo by the user.

The invention provides an alternative approach to solve the above issues. In this approach, the user is not asked to record data to the central server manually, instead the user will login manually when the account data is not previously entered. Once the user submits the login form, the response from the web domain is parsed. If the login response is determined to be successful, the user's login data are captured automatically and recorded to the central server with the permission of the user. The same approach can be used to capture other registration information. Instead of providing a new window for user to record account data to the central server, the user fills in data in an unmapped form, the data are captured automatically and recorded in the central database with the user's permission. The registration information can be information common to many web domains, such as payment information including user's billing name, billing address and credit card information. Or it can contain data specific to certain web domain.

Figure 7:
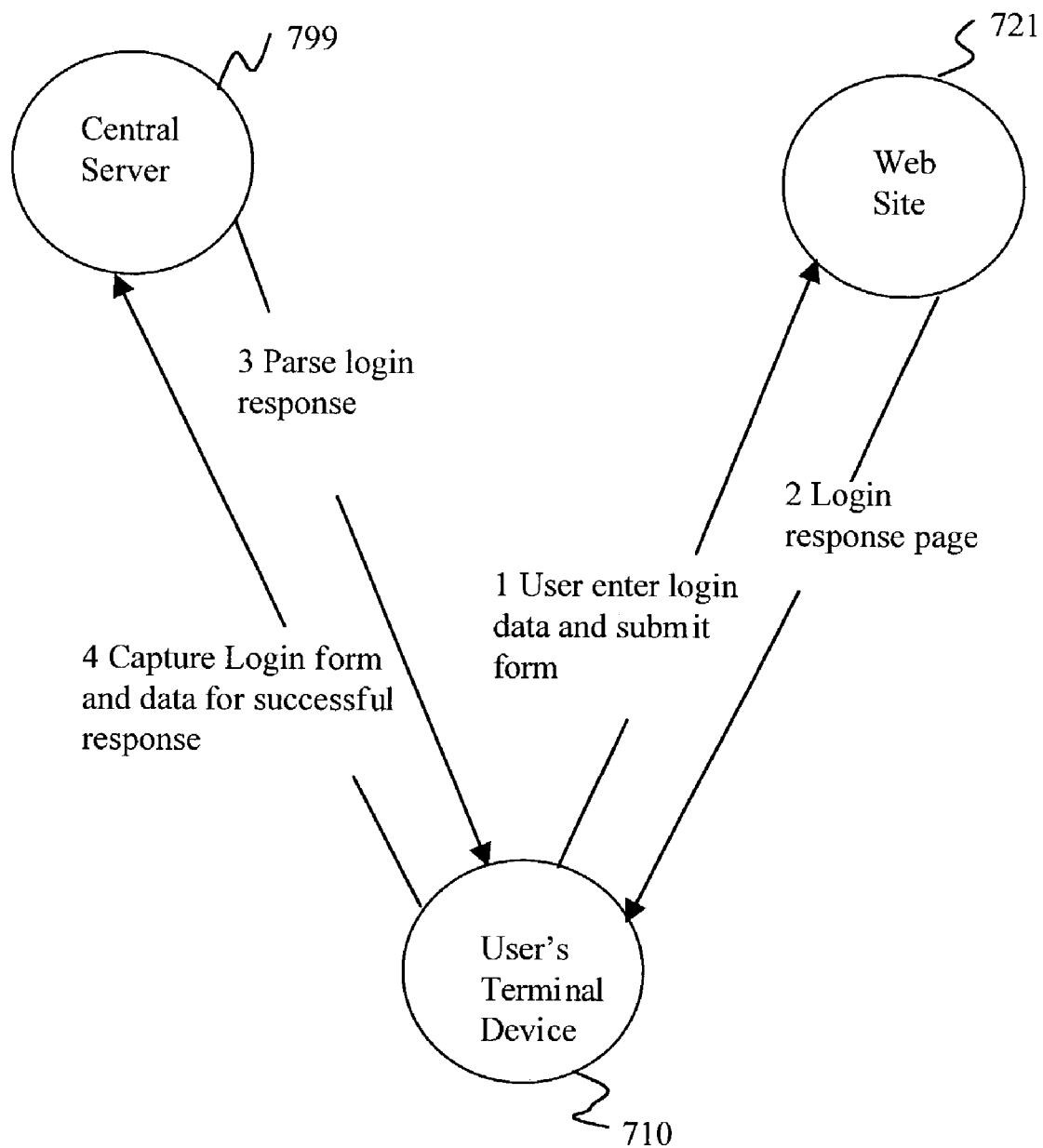
FIG. 7 is a simplified diagrammatic view of one embodiment of automatic data capture feature according to the invention.

FIG. 7 is a simplified diagrammatic view of one embodiment of automatic data capture feature of the invention. In this embodiment, the user is trying to login to a web domain and the account data is not previously entered in the central server. The user enters login data and submit the login form manually (arrow 1). Once the user submits the login form, the web domain server verifies the login data and sends back a response page (arrow 2). The login response page can be either a successful page if the user is authenticated or an error response page otherwise. Program code downloaded from the central server parses the login response page to determine when it is a successful response page or an error response page (arrow 3). If the login response is determined to be successful, the user's login data are captured automatically and recorded to the central server with the permission of the user (arrow 4).

Figure 8:
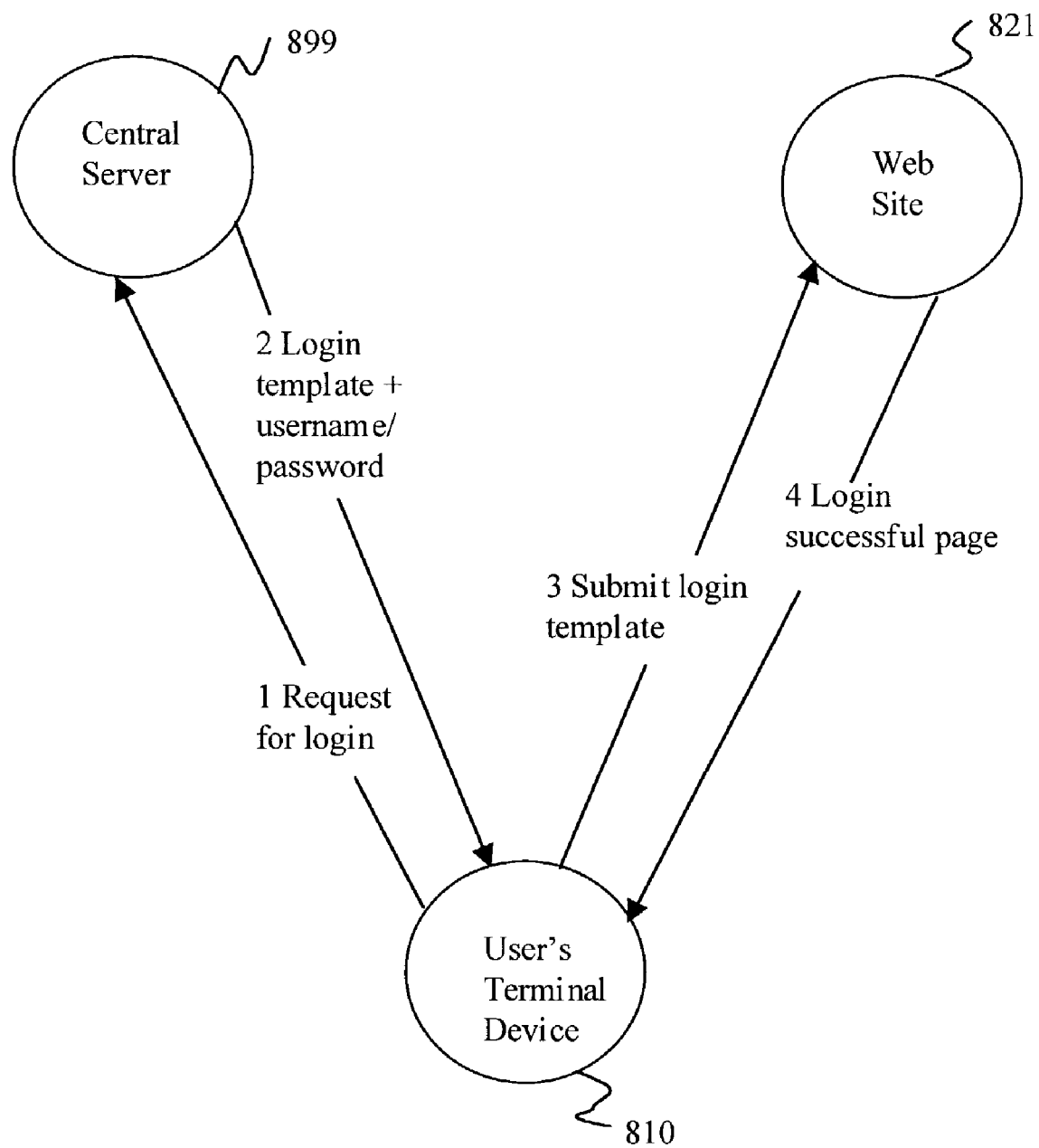
FIG. 8 is a simplified diagrammatic view of one embodiment of the automatic login feature according to the invention.
Figure 9:
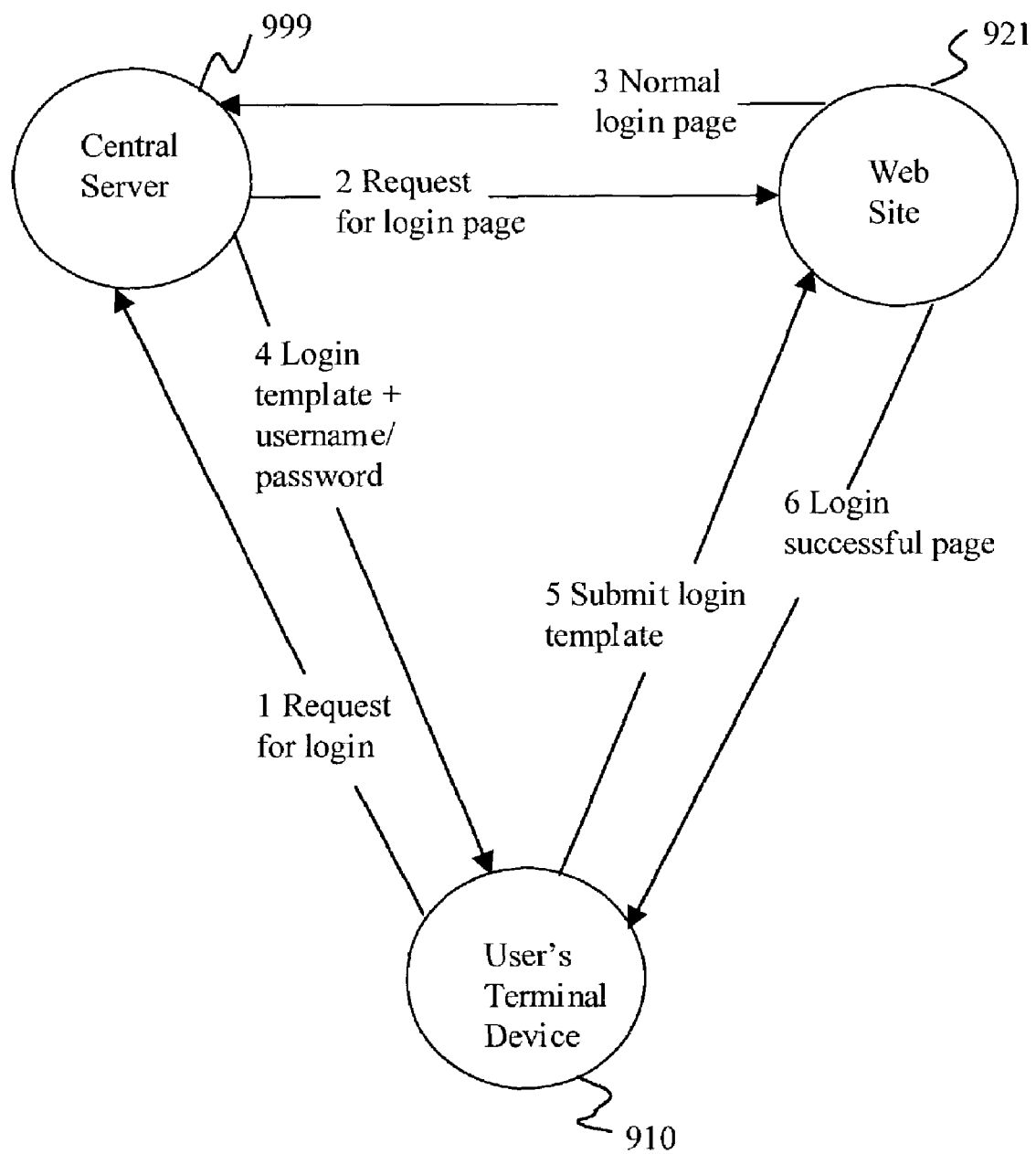
FIG. 9 is a simplified diagrammatic view of another embodiment of the automatic login feature according to the invention.

Once the login data is captured, the user will be able to access the automatic login feature of the invention as illustrated in FIG. 8 and FIG. 9.

In the exemplary automatic login procedure illustrated in FIG. 8, central server 899 may receive a request to log the user into an account maintained at Web site 821; this request is represented by the arrow labeled 1 in FIG. 8. As noted above, subsequent to login with central server 899, all requests for login from the user's computer terminal or device 810 may advantageously be directed through central server 899. Upon invocation of the automatic login procedure, central server 899 may initiate program code employing the form fill technology discussed.

The mapped login form may be retrieved from the database at central server 899 and a login template may be created. The login template may generally be a page, created in the appropriate ML, which mimics the normal login page of the site, such as Web site 821, to which the user would like to login. Additionally, the login template includes the appropriate user data associated with the particular account which is required for login; that is, the form filling feature of the invention is employed to fill the user name and password fields in the correct portions of the login template. In this manner, a login template including all requisite data, in the appropriate format, may be constructed at central server 899. The login template with user name and password data may then be transmitted to the user's device 810, as indicated by the arrow labeled 2 in FIG. 8.

The login feature of the invention preferably includes the additional step of actually submitting the form without further intervention on the part of the user; this automatic submission is depicted by the arrow labeled 3 in FIG. 8. The program code at central server 899, for example, may execute one or more program scripts in conjunction with creating the login template which may automate form submission, through the user's device 810, to Web site 821. An ML page including a form usually includes an operative button or other form action for executing the submission script which unloads the page and delivers the ML data to the server requesting the form. The login feature of the invention may include program code which simulates selection of the operative button in the ML page or some other more complicated or sophisticated form action. Accordingly, the form may be submitted under software control, thereby logging the user into the selected account. At the completion of the login process, Web site 821 may send a confirmation page to the browser at device 810, indicating that login was successful; this transmission is illustrated by the arrow labeled 4 in FIG. 8.

FIG. 9 is a simplified diagrammatic view of another embodiment of the automatic login feature of the invention representing the situation in which the login template is generated dynamically when the user invokes the automatic login feature. Dynamic login template generation may be desirable or required, for example, when a login form has not previously been mapped, or the login form has been removed from the cache. The embodiment illustrated in FIG. 9 is similar to that depicted in FIG. 8; the interaction between the user's device 910 and the central server 999, as well as the interaction between the user's device 910 and the Web site 921, is substantially the same as that illustrated in FIG. 8.

As shown in FIG. 9, the process of dynamic login template generation additionally involves direct interaction between central server 999 and Web site 921. As indicated by the arrow labeled 2 in FIG. 9, central server 999 may request a normal login page from Web site 921. When the login page is received, central server 999 parses the ML of the login page and identifies the login form. A heuristic algorithm may be implemented at central server 999 to identify the nature and structure of the login form at the URL provided by the user.

Irrespective of the manner in which the registered account is set up to function with the login feature, once the central server has been provided with all of the requisite data, subsequent login with respect to any registered account may be automatic upon selection of the desired account; this selection may either be accomplished through the utility window interface described above with reference to FIG. 3, or through unadulterated browser software options. The program scripts at the central server may be adapted to procure the login page from the desired Web site. As noted above, a program script may simulate selection of the submission option in the login page ML such that the form is submitted to the Web site, logging the user into the selected registered account automatically.

A more detailed description of the automatic login feature of the invention is set forth with reference to FIG. 8 and FIG. 9 in copending application, U.S. Ser. No. 09/687,991, filed on Oct. 13, 2000, entitled "METHOD AND SYSTEM OF AUTOMATING INTERNET INTERACTIONS".

From the foregoing, it can be seen that a system designed in accordance with the invention provides a versatile, efficient, and personalized Internet interface for specialized applications, particularly with respect to automating certain interactions which ordinarily must be completed manually. The preferred embodiments disclosed herein have been described and illustrated by way of example only, and not by way of limitation. Other modifications and variations to the invention will be apparent to those skilled in the art from the foregoing detailed disclosure. While only certain embodiments of the invention have been specifically described herein, it will be apparent that numerous modifications may be made thereto without departing from the spirit and scope of the invention.

Accordingly, the invention should only be limited by the claims included below.

The invention claimed is:

1. A system for automating data transactions between computers comprising:
    a first computer server;

a database residing on said first computer server configured to store personal registration and login data concerning at least one user;

a program code residing on said first computer server for automatically selectively extracting stored personal user data from a user generated request to perform an action from a group consisting of: registering with a second computer server and logging in to said second computer server;

program code residing on said first computer server for storing said extracted personal user data in said database;

program code residing on said first computer server for obtaining a blank form, and for automatically parsing said blank form to identify which personal user data should be used to fill in at least a part of said blank form;

wherein said blank form comprises one from a group consisting of: a login form and a registration form;

program code residing on said first computer server for automatically filling in at least a part of said blank form with said identified personal user data; and program code residing on said first computer server for transmitting said filled out form to a user, said form being filled out for the user to transmit to said second server computer in order to perform an action from a group consisting of: registering with said second computer server and logging in to said second computer server.

2. The system of claim 1, wherein said identified personal user data includes data for all fields in said blank form.

3. The system of claim 1, wherein said blank form is obtained from the second computer server.

4. The system of claim 1, further comprising:
an additional database maintained at said first computer server, configured to store form data relating to forms required by at least one other computer server.

5. The system of claim 4, further comprising program code for comparing data fields in said blank form with said stored form data recorded in said additional database.

6. The system of claim 5, further comprising:
form filling program instructions residing on said first computer server, using a result of said comparing data fields in said blank form with said stored form data, for creating a filled form by filling in said blank.

7. The system of claim 6, further comprising:
form submitting program instructions residing on said first computer server, using a result of said form filling program instructions, for automatically submitting said filled form to the second computer server.

8. The system of claim 5, further comprising:
said manually entered data is manually submitted to said at least one other computer server when said stored form data does not include parsed form data from said at least one other computer server.

9. The system of claim 8, further comprising:
program code for parsing a response received from said at least one other computer server.

10. The system of claim 9, further comprising:
program code for capturing said manually entered data and for storing said manually entered data on said first computer server.

11. The system of claim 4, wherein said stored form data includes parsed form data from said at least one other computer server.

12. A method for automating data transactions between computers, the method comprising the steps of:

maintaining a database on a first computer server configured to store personal registration and login data concerning at least one user;

automatically selectively extracting stored personal user data from a user generated request to perform an action from a group consisting of: registering with a second computer server and logging in to said second computer server;

storing said extracted personal user data in said database;

obtaining a blank form, from a group of forms consisting of a registration form and a login form;

automatically parsing said blank form to identify which personal user data should be used to fill in at least a part of said blank form;

automatically filling in at least a part of said blank form with said identified personal user data; and transmitting said filled out form to a user, said form being filled out for the user to transmit to said second server computer in order to perform an action from a group consisting of: registering with said second computer server and logging in to said second computer server.

13. The method of claim 12, wherein the steps are performed in the order recited.

14. The method of claim 12, wherein said step of selectively extracting includes extracting data for all fields in said blank form.

15. The method of claim 12, wherein said step of obtaining a blank form includes receiving form data from the second computer server.

16. The method of claim 12, wherein said step of obtaining a blank form includes receiving login form data from the second computer server.

17. The method of claim 12, further comprising the step of:
maintaining an additional database at said first computer server, configured to store form data relating to forms required by at least one other computer server.

18. The method of claim 17, further comprising comparing data fields in said blank form with said stored form data recorded in said additional database.

19. The method of claim 18, further comprising the step of:
submitting said manually entered data to said second computer server.

20. The method of claim 19, further comprising the step of:
parsing a response received from said second computer server.

21. The method of claim 20, further comprising the step of:
capturing said manually entered data and recording said manually entered data to said first computer server.

22. The method of claim 17, further comprising parsing form data from said at least one other computer server.

23. The method of claim 22, further comprising the step of:
automatically submitting the result of said filling to the second computer server.

24. The method of claim 12:
wherein a user has registered a registration identifier and a registration password at said first computer server.

25. The method of claim 24, wherein said first computer server allows said user to specify whether additional authentication is required when responding to said request from said second computer server.

26. The method of claim 25, wherein said user only needs to input said registration password while said registration identifier has been entered and stored previously on the device from which said user is submitting said request.

27. The method of claim 24, further comprising an authentication step wherein said user is required to input said registration identifier and said registration password when submitting said request to said second computer server.

28. The method of claim 24, wherein said step of selectively extracting includes extracting data for all fields in said blank login form.

29. The method of claim 28, wherein said step of parsing includes comparing data fields in said blank login form with said stored form data recorded in said additional database.

30. The method of claim 24, wherein said step of obtaining a blank login form includes receiving form data from said second computer server.

31. The method of claim 24, further comprising the step of:

maintaining an additional database at said first computer server; said additional database having stored form data recorded therein; said stored form data relating to login forms required by at least one other computer server.

32. The method of claim 31, wherein said step of maintaining an additional database includes parsing login form data from said at least one other computer server.

33. At least one computer readable medium containing a computer program product for automating data transactions between computers, the computer program product comprising:

program code for maintaining a database on a first computer server configured to store personal registration and login data concerning at least one user;

program code for automatically selectively extracting stored personal user data from a user generated request to perform an action from a group consisting of: registering with a second computer server and logging in to said second computer server;

program code for storing said extracted personal user data in said database;

program code for obtaining a blank form, from a group of forms consisting of a registration form and a login form;

program code for automatically parsing said blank form to identify which personal user data should be used to fill in at least a part of said blank form;

program code for automatically filling in at least a part of said blank form with said identified personal user data; and program code for transmitting said filled out form to a user, said form being filled out for the user to transmit to said second server computer in order to perform an action from a group consisting of: registering with said second computer server and logging in to said second computer server.

\* \* \* \* \*